United States Patent [19]

Burmeister et al.

[11] Patent Number: 4,579,614
[45] Date of Patent: Apr. 1, 1986

[54] LABEL SHRINK OVEN

[75] Inventors: Robert J. Burmeister; Frank J. DiFrank, both of Toledo; Russell W. Heckman, Perrysburg, all of Ohio

[73] Assignee: Owens-Illinois, Inc., Toledo, Ohio

[21] Appl. No.: 690,557

[22] Filed: Jan. 11, 1985

[51] Int. Cl.⁴ .............................................. B32B 31/26
[52] U.S. Cl. ...................................... 156/85; 156/86; 156/499; 53/446
[58] Field of Search ................ 156/84, 85, 86, 499; 53/442

[56] References Cited

U.S. PATENT DOCUMENTS

| | | | |
|---|---|---|---|
| 3,257,769 | 6/1966 | Ford | 53/442 |
| 3,399,506 | 9/1968 | Howe | 53/442 |
| 3,897,671 | 8/1975 | Higgins | 53/442 |
| 4,048,281 | 9/1977 | Brummett et al. | 156/86 |
| 4,172,873 | 10/1979 | Spicer | 156/86 |
| 4,416,714 | 11/1983 | Hoffmann | 156/86 |

Primary Examiner—Caleb Weston
Attorney, Agent, or Firm—John R. Nelson

[57] ABSTRACT

An infrared heat tunnel with hot air circulation for heat shrinking wraparound labels on containers which are moved through the tunnel in an upright attitude on an open weave conveyor belt. The infrared heating is by electrical strip heaters along the sides of the tunnel and air is blown by blowers across these heaters to impinge on the sides of the containers. The air is drawn down through the conveyor belt since the inlet to the blowers is from beneath the conveyor. A vertical air curtain along each side of the first half of the tunnel is adjustable in length to effectively delay the skin shrinkage of the film-foam material of the labels in order to get wrinkle-free shrinkage of the film and underlying foam about the container wall and heel areas without bottle rotation.

14 Claims, 4 Drawing Figures 4,579,614

LABEL SHRINK OVEN

BACKGROUND OF THE INVENTION

This invention relates to a method and apparatus for shrinking labels which have been adhered to containers and adhered, by an overlap forming a seam, to itself without requiring rotation of the container as it passes through a linear shrink tunnel. The label in the present invention is formed of a heat shrinkable thermoplastic material having a film side and a foam side with the foam side being positioned against the container about which the label is wrapped.

It has been the practice in the past to use apparatus and methods for providing and shrinking film labels to cylindrical containers by a series of steps such as:

(1) Heat shrink film is first formed into a tube slightly larger in diameter than the container to which it is to be applied;

(2) The container is preheated or, if the film application is carried on in conjunction with the manufacture of glass containers, the glass container can be taken from the manufacturing operation while still warm;

(3) The cylindrical sleeve is placed over the container; and, (4) The sleeve is then heated to shrink it onto the container.

In those situations where the film is preformed into a cylinder rather than being applied directly from a roll of film material to the container, the procedure is somewhat elaborate and the shrinking of the sleeve is carried out in a long tunnel and the containers are rotated as the shrinkage occurs. A representative patent showing such a method and apparatus is found in U.S. Pat. No. 3,822,459, issued July 9, 1974 to Stephen W. Amberg et al.

Another labeling system for heat shrink labels is disclosed in U.S. Pat. No. 4,416,714, issued to Wolfgang Hoffman and dated Nov. 22, 1983. In this patent there is disclosed a system for applying a precut label to the side of rotating container by securing the leading edge of the label by adhesive to the container and by adhesive being applied between the overlapping leading end and trailing end. The label is of such a width that it projects beyond the junctions of the end portions of the body portion of the container resulting in free standing edges which are then heat shrunk onto the container by heat from an external source. In order for the overlapping surfaces of the label to be formed in a complete adhesive seal, it was necessary to provide a backup member near the heel and near the shoulder of the container when the overlapping ends were pressed together to form a complete vertical seam. Additionally, in the shrinking of such a label, the shrinkage was affected by applying heat to one side of the container, thus necessitating the rotation of the container about its vertical axis as it passes in front of a series of heating zones.

In the present invention, the label has been applied to the container by application of a solvent to the foam surface of a coextruded film-foam sheet of material cut into a label length. The foam with applied solvent is brought into contact with the container. The container is then rotated and a trailing edge of the label is provided with a vertical solvent zone which, when overlapped with the leading edge, forms a vertical and complete seal. The seal, by reason of its being formed from a solvent rather than an adhesive or a heat sensitive hot melt adhesive, becomes instantly tacked to the bottle and, upon overlapping of the trailing and leading edge of the label, firmly adheres to itself to form a strong vertical seam. The bottle thus provided with the wrap-around label is carried upright on a conveyor through the heat shrink tunnel and system of the invention.

It is an object of the present invention to provide an apparatus and method for shrinking an applied label of a heat shrinkable plastic which is wrapped around a container without requiring rotation of the container after the label is applied and by linear movement of the labeled container through a shrink tunnel. Again, orientation of the labeled container relative to its seam and movement through the tunnel is not a requirement.

It is a further object of this invention to provide a means for heat shrinking an applied label sleeve about a container in which infrared heat is utilized with the introduction of hot air over the leating elements and with a system of providing more or less heat during the travel of the container through a tunnel.

It is an additional object of this invention to provide a shrink tunnel which is adjustable in width as well as height for accommodating containers of varying sizes and dimensions.

Other objects will be apparent from the following description taken in conjunction with the annexed sheets of drawings.

DETAILED DESCRIPTION OF THE DRAWINGS

Figure 1:
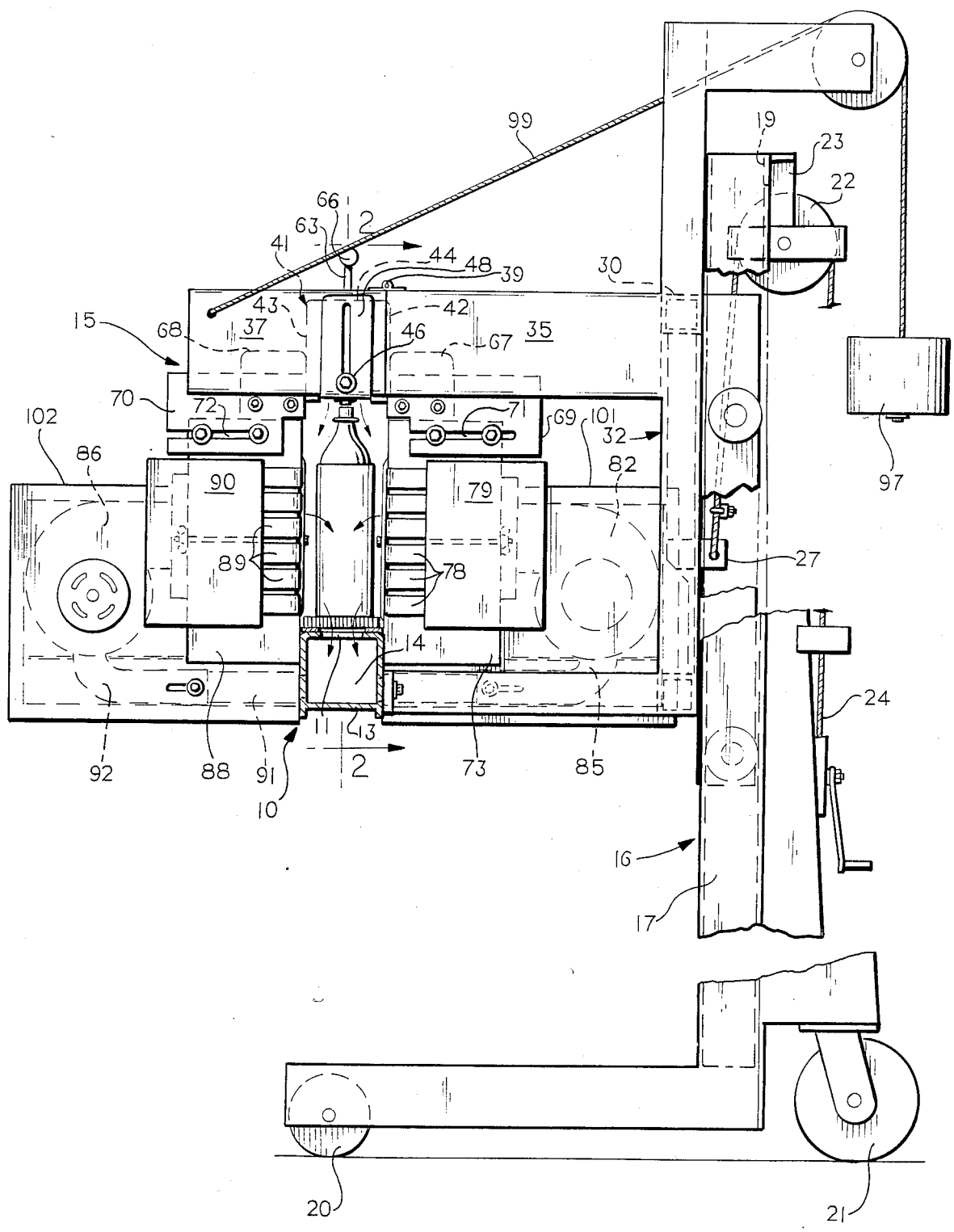
FIG. 1 is an end elevational view of the shrink tunnel of the invention.

With particular reference to the drawings, there is shown a horizontal conveyor 10 having a series of openings 11 along the length thereof in the vicinity of the tunnel. Overlying the openings in the upper surface of the conveyor 10 is a moving foraminous belt 12. Additionally, the conveyor 10 is closed at its bottom 13 and by a pair of vertical end walls 14, thus providing a closed chamber beneath the belt 12 along the length of an overlying tunnel generally designed 15. Generally speaking, the tunnel 15 is supported at one side by a vertical hoist 16, which generally comprises a pair of vertically extending frame members 17 and 18 joined together at their tops by a horizontal hollow beam 19. The frame members 17 and 18 actually are U-shaped channel members. The two frame members 17 and 18 are supported from the floor by sets of rollers 20 and 21 such that the hoist 16 is movable along the floor, and in addition, the hoist 16 is provided with an upper pulley 22 supported from above by brackets 23 fixed to the horizontal beam 19. The pulley 22 carries a braided steel cable 24 that extends down to a drum 25 which has a hand crank 26 connected thereto. Operation of the hand crank will wind the cable 24 therebout and the other end of the cable is fasted to a plate 27 fixed to the back of the tunnel 15. The plate 27 is fixed to a vertical beam 28 (See FIG. 3) which is bolted at its upper and lower ends with bolts 29 to hollow horizontal beams 30 and 31 which constitute the upper and lower horizontal members of a generally rectangular frame 32. A pair of vertical beams 33 and 34 at either end of the beams 30 and 31 complete the rectangular frame which is connected to the hoist 16. Extending outwardly from the upper corners of the upper ends of the horizontal beam 30 are a pair of parallel beam members 35 and 36. As best seen in FIG. 1, the beam 35 is fairly high, or vertical in extent as positioned, and extends from the rear frame 32 outwardly into overlying relationship with respect to the conveyor 10.

Hinged to the forward or outward ends of the beams 35 and 36 are what amount to extensions of these beams, these extensions being designated 37 and 38, respectively. These beam extensions 37 and 38, as previously mentioned, are hinged by horizontal hinges 39 and 40 such that the extensions and the members carried thereby may be swung vertically upward about the hinges 39 and 40 to provide access to the interior of the tunnel. Extending between the extensions 37 and 38 is a horizontal, insulated air manifold 41. The air manifold 41 is comprised of a generally U-shaped, elongated, downwardly open member having vertical walls 42 and 43 and a top wall 44. Within the manifold 41 is positioned a heat insulated, rectangular chamber or baffle member 45. The baffle member 45 extends substantially one-half the length of the tunnel and, by its positioning centrally with respect to the interior of manifold 41 which is open at the bottom in the area occupied by the baffle 45, defines two spaced-apart, downwardly open air nozzles that extend one-half the length of the tunnel 15 at opposite sides of the interior of the tunnel. The air manifold 41 and baffle 45 are mounted together and are supported relative to the extensions 37 and 38 by a pair of bolts 46 and 47 which extend outwardly therefrom through vertical slots formed in a pair of end plates 48 and 49 which in turn are fixed to the beam extensions 37 and 38.

Figure 4:
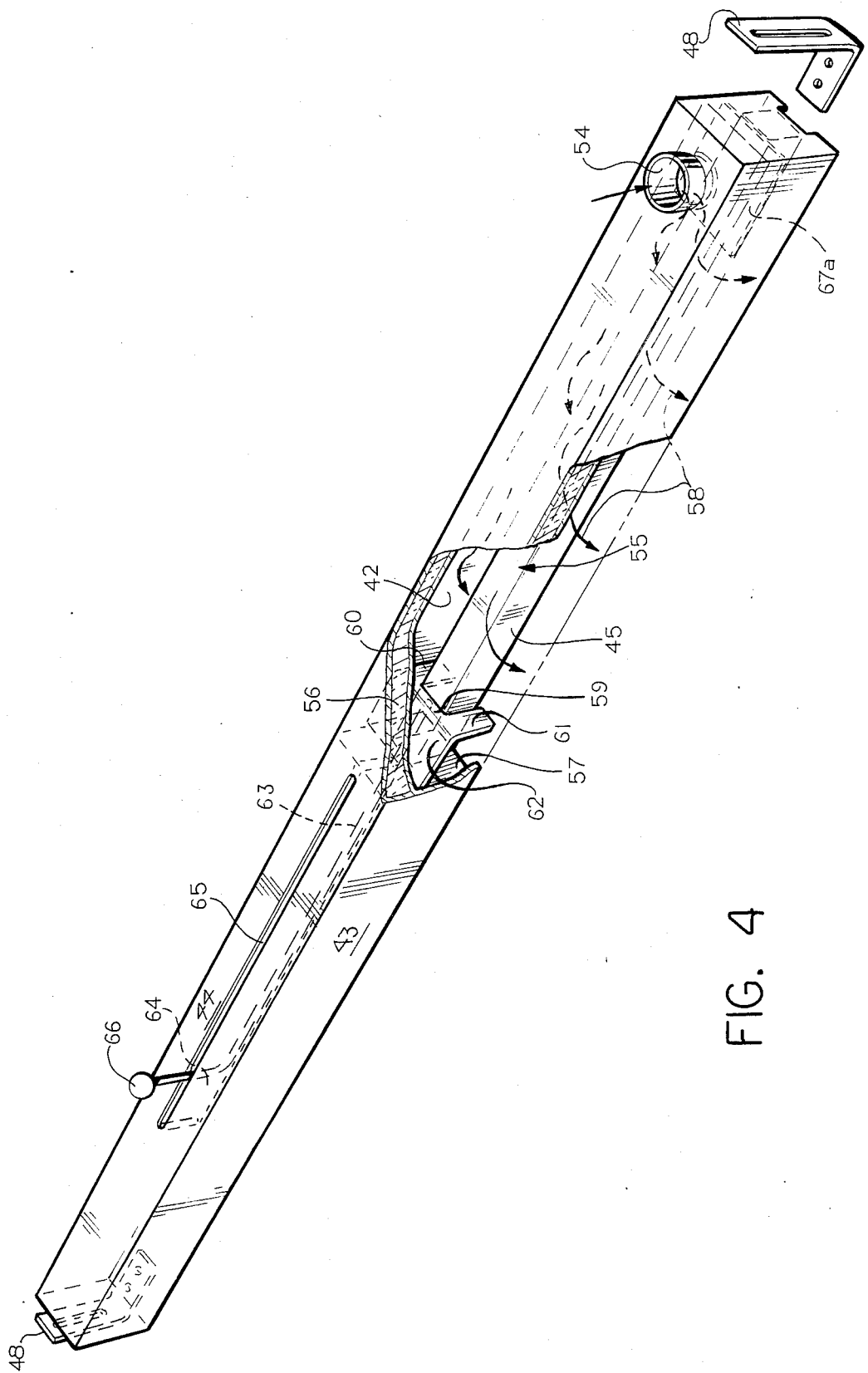

Extending outwardly from the frame 32 adjacent the two bottom corners thereof are a pair of hollow beams 50 and 51. At the forward end of these beams are fastened a pair of vertical plates 52 and 53. The plates 52 and 53 are bolted to the one side of the conveyor 10 when the tunnel is positioned over the conveyor, as shown in the drawings in FIG. 2. The air manifold 41, as perhaps best seen in FIG. 2 where it is shown in cross-section and in FIG. 4 where it is shown in enlarged perspective view, can be seen to include the two vertical walls 42 and 43 and the top wall 44. A round air entrance tube or pipe 54 extends through the top wall adjacent the forward end of the tunnel or, in other words, that end of the tunnel through which the containers to be treated enter the tunnel. The pipe 54 communicates with a chamber 55 therebeneath which is defined by the lower surface of the upper insulated wall 44, the side walls 42 and 43 and the upper surface of the insulated baffle 45. The insulated baffle 45 is generally rectangular in shape and is filled with insulating material 56 which also extends into and fills the opposite end of the air manifold 41. The baffle 45 actually extends in one direction from a vertical wall 57 which divides the air manifold 41 into two chambers approximately equal in length when viewed in FIG. 2. With this configuration, it can be seen that when air is drawn from below through the entrance pipe 54, it may flow into the chamber 55 and about the baffle 45 exiting in a downward direction, as shown by the arrows 58 in FIG. 4. Within this chamber 55 is positioned a generally vertical member 59 having depending legs 60 and 61 which extend downwardly along the sides of the baffle 45. The upper edge of the member 59 has a horizontally extending platelike portion 62. The member 59 has a horizontal rod 63 connected thereto. The rod 63 extends through the wall 57 and lies within a generally, U-shaped in cross-section, chamber 64 that extends beneath a horizontal slot 65 formed in the upper wall 44 of the air manifold 41. The rod 63 is bent upwardly at its end opposite the plate 62 and extends through the slot 65. A suitable hand operating knob 66 is provided on the upwardly extending end of the rod 63. Manipulation of the rod 63 will move the member 59 to the left or right as desired and it should be noted that the face of the member 59, when moved to the extreme right as viewed in FIG. 2, will abut a horizontal deflector plate 67a that is below the lower end of the air inlet pipe 54, effectively interrupting any flow of air into the chamber 55. Any other movement of the member 59 in the opposite direction will permit air to enter into the chamber 55 after being deflected by plate 67a and the effective length of the chamber 55 is then determined by the positioning of the member 59 therein, it being understood that the air will not pass the member 59, it will only be permitted to exit downwardly, as shown by the arrows 58 in FIG. 4.

On either side of the air manifold 41 are placed two rectangular elongated insulated chambers 67 and 68. The chambers 67 and 68 are of sufficient height relative to the air manifold 41 that vertical adjustment of the air manifold 41, as provided by the vertical slot in the mounting plate 48, will not open any area along the sides of the chamber 41. Sides of the chambers 67 and 68 are in abutting relationship with respect to the air manifold 41. These insulating chambers 67 and 68, as best seen in FIG. 1, are bolted to vertical plates 69 and 70 which in turn are fixed to the beam 35 and beam extension 37, respectively. It should be understood that there are plates 69 and 70 at both ends of the insulated chambers 67 and 68.

As shown in FIG. 1, the manifold 41 is at its highest elevation permitting the tallest container to be carried on the conveyor 12 through the tunnel. It should be understood that this manifold 41 may be lowered downwardly, as viewed in FIG. 1, to the extent permitted by the slot in the plates 48 and 49. The plates 69 and 70 are provided with horizontal extending slots 71 and 72.

Figure 2:
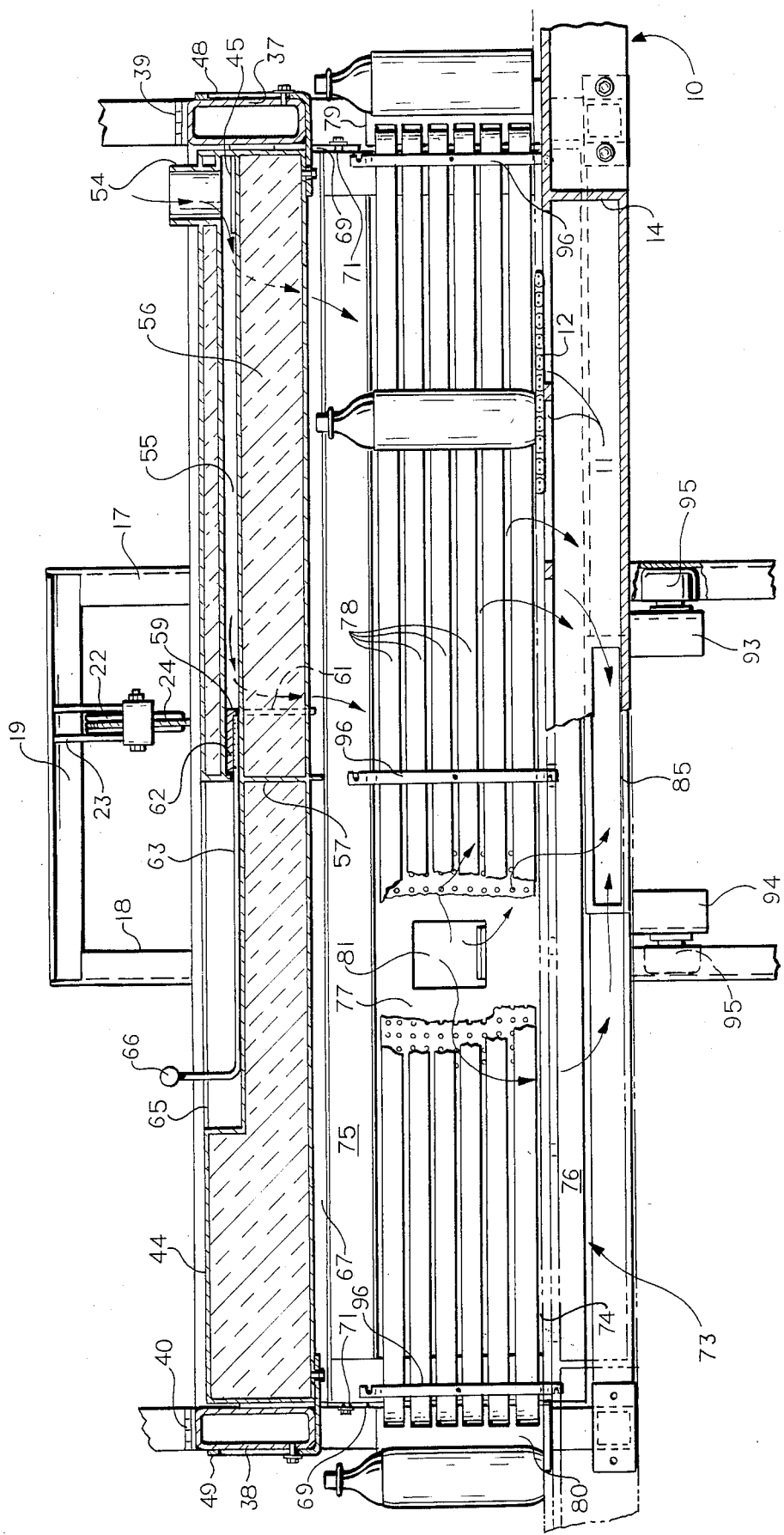
FIG. 2 is a cross-sectional view taken at the line 2—2 of FIG. 1.
Figure 3:
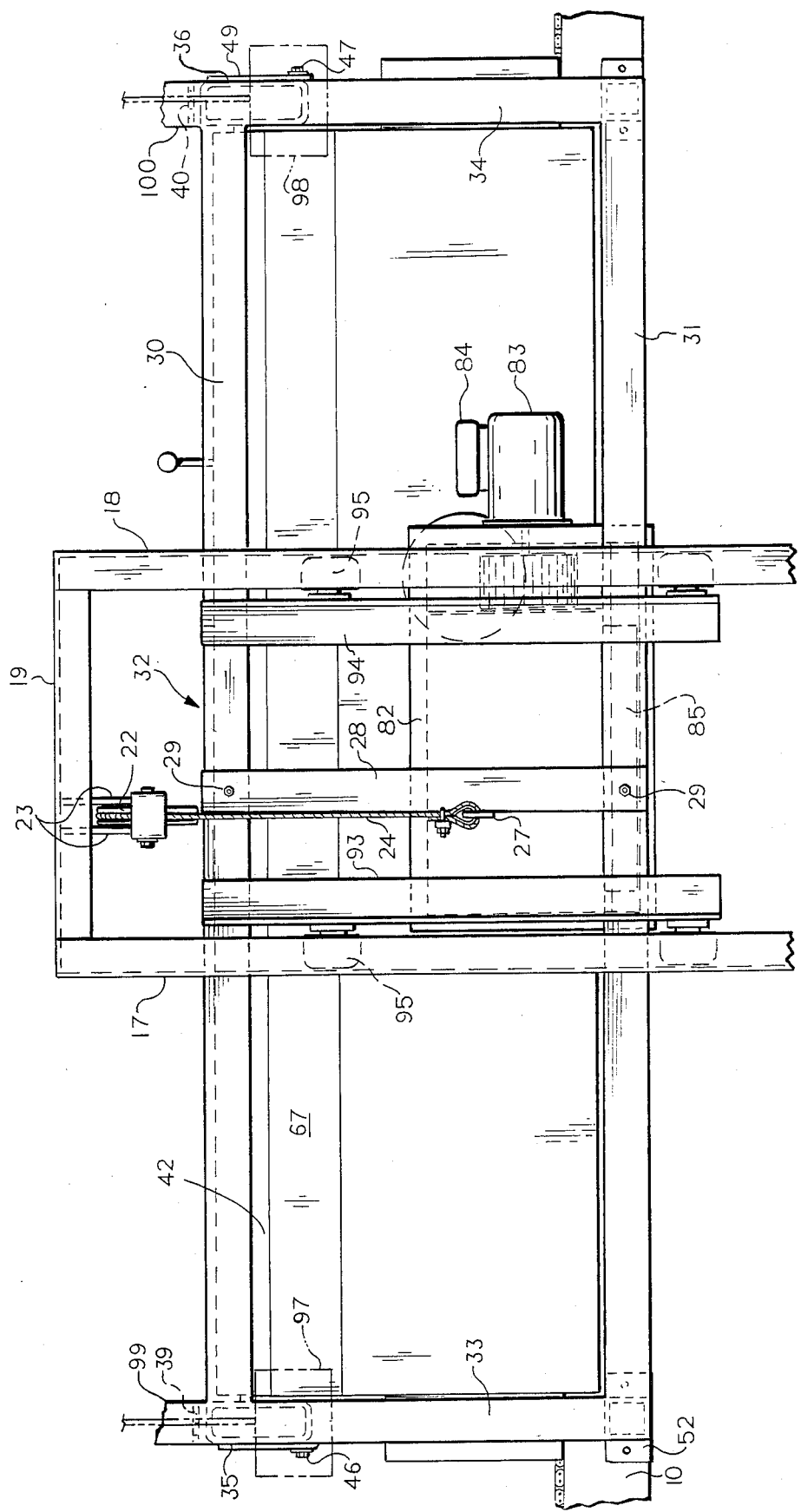
FIG. 3 is a right side elevational view of the upper portion of the apparatus illustrated in FIG. 1; and, FIG. 4 is an enlarged perspective view of the air manifold for the tunnel of the invention.

Between the plates 69, as best seen in FIG. 2, there is positioned an elongated air chamber 73, which is generally rectangular in shape, and is closed on all of its sides except the front face thereof which is formed with an elongated horizontal open area 74 between vertical panels 75 and 76 which extend across the front of and close those areas of the front of the chamber 73. Covering the open area 74 between the panels 75 and 76 is a perforated plate or screen 77 whose function is to disperse air flow the length of the tunnel and to control the rate of flow of air outwardly through the open area 74 into the zone occupied by the containers passing through the tunnel. Overlying the screen, as viewed in FIG. 2, are a plurality of elongated infrared heater elements 78 of which there are six shown in FIG. 2. The heater elements 78 are bent rearwardly, as viewed in FIG. 2, and have their ends extending into connector boxes 79 and 80. The back wall of the air chamber 73 is provided with an opening 81 to which a blower 82 has its outlet connected. The blower 82 is driven by an electric motor 83 which is coupled to the end thereof, as shown in FIG. 3. An electrical relay box 84 is mounted above the motor 83. Air to the blower 82 comes through an entrance duct 85 that matches with a rectangular side opening into the area beneath the conveyor belt 12. As previously stated, the conveyor 10 has an open mesh belt or surface 12 which communicates through openings 11 to the interior of the conveyor and in this way operation of the blower 82 will blow air across the heater elements 78 and the air will then impinge on the containers that are positioned on the conveyor and be swept around the sides of the containers and down across the heels of the containers to exit into the interior of the conveyor and thence return through the duct 85 back to the inlet to the blower. In this way, the air is recirculated and is heated during this circulation by passing over the infrared heater element 78.

While the description above has been directed to the details of the unit shown specifically in FIG. 2 and at the right side of FIG. 1, there is an identical unit mounted to the left, as viewed in FIG. 1, with this unit having a blower 86 driven by a motor 87 for blowing air into a chamber 88. The chamber 88 has an opening along its front which is provided with a screen and has overlying infrared heating elements 89 placed thereover. The heating elements 89 are bent back, as was illustrated for the elements 78, and their ends also are extended into a junction box 90 which is mounted to the side of the chamber 88. It should be understood the junction boxes 79 and 90 all are provided with electrical inputs necessary to provide sufficient power to the infrared heating elements. As in the case of the blower 82, the blower 86 will blow air through the elements 89 and the air will impinge on the side of the bottle positioned in front thereof and exit down through the conveyor 12 into the chamber 14, and as in the case of the blower 82, blower 86 has a duct 91 that is fixed to the side of the conveyor and through which an opening in the conveyor will permit air to enter. The duct 91 is adjustably connected to an inlet duct 92 for the blower 86. The adjustability of the length of the duct formed by the ducts 91 and 92 is such that it permits the adjustability of the air chambers 73 and 88 toward or away from the position of the conveyor and therefore the plane defined by the axis of the bottles as they are being moved through the tunnel.

Thus, it can be seen that with the apparatus as set forth in detail above, that containers that have shrink labels thereon and which extend down to approximately the level of the conveyor 12 may have these labels shrunk evenly by the movement of hot air about the sides of the bottle, as well as the infrared heating by the radiation of the heater elements 78 and 89 directly. The heater elements are elongated strap-like elements and are maintained in the position shown, parallel to the sides of the tunnel by retaining strips 96 at either end and at the center of their span. Also, by reason of the movement of the heated air downwardly about the heel portion of the container, the heel area, which requires greater shrinkage because of its configuration, will be evenly shrunk in this area while less heat in effect is being applied to the upper areas about the bottle where less shrinkage is required. Additionally, since the present invention is used to shrink wraparound labels which have been applied to the containers with the labels being formed of a film-foam coextruded polymer, such as polystyrene, with the foam layer adhered to the bottle and the film layer is exteriorly exposed, it has been found that by using a solvent for the foam layer and by applying the solvent to this foam layer, the overlap area of the label will adhere to itself and the adhesion will be sufficient to withstand the shrinking of the label to the extent to provide an adhered cylindrical label which is shrunk against the wall of the container and also against the heel portion as well. This is all accomplished without requiring the rotation of the container, principally because the combination of the air and infrared heat being applied to the side walls of the container. By having this heated air sweep down over the heel area as well, this air is recirculated to utilize the most efficient heating system. The function of the air manifold, which was described in detail earlier, is to effectively cool the sides of the bottle with incoming, downwardly moving air and in effect to delay the contraction or the application of heat to the label on the bottle so as to accommodate the system for changing or varying speeds of application of labels to the containers and to also control the surface shrink characteristics and assure an even shrinkage without requiring rotation of the containers as they pass by the fronts of the infrared heating elements. As might be expected, the apparatus of the invention may be required to provide the shrinkage for a smaller number of containers or larger number of containers, depending upon the speed with which the labels are applied and also depending upon the size or height and width of the container being labeled. Thus, in order to take care of all of these parameters, the adjustability of the length of the air manifold is significant and is important in the successful operation of the invention in its various required heat shrinking of labels on a wide spectrum of container shapes and sizes.

The portability of the tunnel 15 is apparent in that it is capable of being hoisted upwardly from the conveyor 10 and moved to another location where a conveyor which is adapted to receive the unit may be the desired new position. In order to facilitate and to steady the raising and lowering of the tunnel 15, the tunnel at its back carries a pair of vertical angle irons 93 and 94 to which four rollers 95 are connected, with the rollers 95 adapted to ride within the vertical frame members 17 and 18 of the hoist 16.

As previously explained, the forward extensions 37 and 38 are hinged to the beams 35 and 36 so that they may be swung upwardly to give access to the interior of the tunnel to clear the tunnel in the event the conveyor stalls or of a power failure. To assist in this pivoting action, a pair of counterweights 97 and 98 are connected to the extensions by cables 99 and 100.

In order to retain as much heat in the recirculating air system, the blowers 82 and 86, as well as the ducts 83, 91 and 92, are enclosed by insulation chambers 101 and 102.

Having described the best mode contemplated by the inventor for the invention, it should be apparent that other modifications might be resorted to without departing from the spirit and scope of the appended claims.

What is claimed:

1. Apparatus for heat shrinking a wrap-around label on a container wherein the label surrounds the side wall of the container and extends from adjacent the heel to near the shoulder, comprising a flat top conveyor for transporting the containers in an upright attitude in a generally linear, spaced-apart line, a heated tunnel extending along the sides of said conveyor, said tunnel comprising heater means extending along the length of the conveyor at an elevation substantially coextensive with the height of a label on a container being transported by said conveyor, said heater means including a plurality of elongated heater elements at vertically spaced intervals and means for blowing air through the spaces between the heaters to thereby impinge hot air on the sides of the bottle labels to effect shrinkage thereof, and adjustable means extending along a portion of said heater length for disrupting the movement of heated air across the conveyor at a selected length of travel of containers through said heater means.

2. The apparatus of claim 1 wherein said conveyor has a foraminous moving belt surface and means connected beneath said belt for exhausting air from the interior of the tunnel.

3. The apparatus of claim 1 wherein said means for disrupting air flow across the conveyor comprises means for producing vertical currents of air extending downward on both sides of the path of movement of containers on a portion of said conveyor length.

4. The apparatus of claim 2 further including duct means extending from beneath the conveyor belt, and wherein said means for blowing air are blowers and said duct means extend to the inlet for said blowers whereby heated air is recirculated by said blowers.

5. The apparatus of claim 3 wherein said means for producing vertical currents of air comprises an insulated member extending over the conveyor and closing the top of the space between the heaters, said insulated member being formed with an elongated manifold chamber therein, a pair of downwardly extending, open bottom channels at each side of said manifold chamber and extending coextensive therewith, and air inlet means to said manifold at one end thereof.

6. The apparatus of claim 5 further including means spanning the cross-sectional area of said manifold and open-bottom channels for forming a wall in said manifold and means connected to said wall for adjusting the horizontal position of said wall to effectively vary the length of said manifold.

7. The apparatus of claim 1 wherein said heated tunnel comprises a pair of opposed horizontally extending, rectangular chambers, open along the side facing the conveyor and spaced from each other to permit a container to pass therebetween, a perforate plate extending over the open side of each chamber to disperse air flowing out of the chamber, a blower connected to an opening in the back of each chamber for supplying air to the interior of each chamber and spaced-apart heater strips extending horizontally over the perforate plate for heating the air passing through the perforate plate.

8. The apparatus of claim 7 wherein each chamber is mounted for adjustment toward and away from each other to vary the spacing depending upon the diameter of the container being labeled.

9. The apparatus of claim 8 further including a pair of inlet ducts connected to the inlet to said blowers, said ducts connected to openings in a chamber formed beneath the conveyor belt and horizontal adjusting means for changing the length of said ducts to accommodate adjustment of said chambers.

10. The apparatus of claim 5 wherein said insulated member is vertically adjustable relative to the conveyor for accommodating containers of different heights.

11. The apparatus of claim 1 wherein said shrink tunnel is mounted on a generally vertical, rectangular frame with horizontally extending arms extending therefrom with said tunnel supported by said arms, and a vertical hoist connected to said rectangular frame, for supporting said frame for vertical adjustment of the entire tunnel.

12. The apparatus of claim 11 wherein said hoist is provided with wheels for moving the tunnel into position relative to a label applying machine conveyor.

13. The method of shrinking a wrap-around thermoplastic label on a container where the label is tacked to the container and to itself to form a sleeve about the full circumference of the container with a lower portion extending to near the plane of the bearing surface of the container, comprising the steps of, moving containers in a spaced-apart line into and through a shrink tunnel, applying infrared radiation from an elongated source to opposed sides of the containers over the full height of the labels thereon while in the tunnel, blowing air from both sides of the tunnel through the infrared radiation source to heat the air and impinge the heated air about the sides of the containers, withdrawing air downwardly about the heel of the containers through the containers supporting and moving means, recirculating the withdrawn heated air back to the sides of the containers, introducing cooling air in vertical curtains along the sides of the containers between the containers and the infrared source and controlling the length of the air curtain relative to the tunnel length to effect wrinkle-free shrinkage of the sleeve label about the exterior of the container including the lower portion about the heel.

14. The method of claim 13 wherein the step of introducing cooling air in vertical curtains comprises opening the inlet to an air manifold above the spaced-apart line of moving containers in the tunnel and drawing air from said manifold in a downward direction by the withdrawing of air about the heel of the container.

* * * * *